(12) United States Patent
Feeley

(10) Patent No.: US 7,226,027 B1
(45) Date of Patent: Jun. 5, 2007

(54) DEVICE FOR MOUNTING AN OBJECT AT THE CORNER OF A ROOM

(76) Inventor: T. J. Feeley, P.O. Box 1443, Cody, WY (US) 82414

( * ) Notice: Subject to any disclaimer, the term of this patent is extended or adjusted under 35 U.S.C. 154(b) by 121 days.

(21) Appl. No.: 10/760,679

(22) Filed: Jan. 20, 2004

(51) Int. Cl.
*A47B 96/06* (2006.01)
*A47G 29/00* (2006.01)
*A47K 1/00* (2006.01)
*E04G 3/00* (2006.01)
*E04G 5/06* (2006.01)

(52) U.S. Cl. .................... 248/220.1; 248/309.1
(58) Field of Classification Search ............ 248/220.1, 248/220.21, 235, 250, 309.1; 381/124; 181/150, 181/156, 153
See application file for complete search history.

(56) References Cited

U.S. PATENT DOCUMENTS

| | | | | |
|---|---|---|---|---|
| 2,340,545 A | * | 2/1944 | Marsh | 217/65 |
| 3,692,265 A | * | 9/1972 | Barriger | 248/220.1 |
| 4,727,815 A | * | 3/1988 | Miller | 108/42 |
| 6,467,928 B2 | * | 10/2002 | Crelin | 362/147 |
| 6,488,247 B1 | * | 12/2002 | Gonzalez | 248/201 |
| 6,527,236 B1 | * | 3/2003 | Situ | 248/220.1 |
| 6,532,704 B2 | * | 3/2003 | Hart | 52/202 |
| 2001/0027661 A1 | * | 10/2001 | Nishikawa et al. | 62/259.1 |
| 2003/0029975 A1 | * | 2/2003 | Cowan et al. | 248/220.1 |

\* cited by examiner

*Primary Examiner*—Amy J. Sterling
(74) *Attorney, Agent, or Firm*—Daniel S. Polley, P.A.

(57) ABSTRACT

An assembly for mounting an object at a corner area of a room. A first embodiment includes a mounting member having a rear cutout. The mounting member is secured to the walls adjacent the corner to define a receiving area for receipt of an insertion member attached to the object. A lower portion of the object can also rest upon a ledge portion of the mounting member. In a second embodiment, a first mounting member having a top flange is secured at the corner. A second mounting member attached to the object defines an area for receiving the top flange. The mounting members can be provided with lower apertures that are aligned with each other for insertion of a retaining screw. The second mounting member can also be supported at a bottom ledge of the first mounting member.

15 Claims, 12 Drawing Sheets

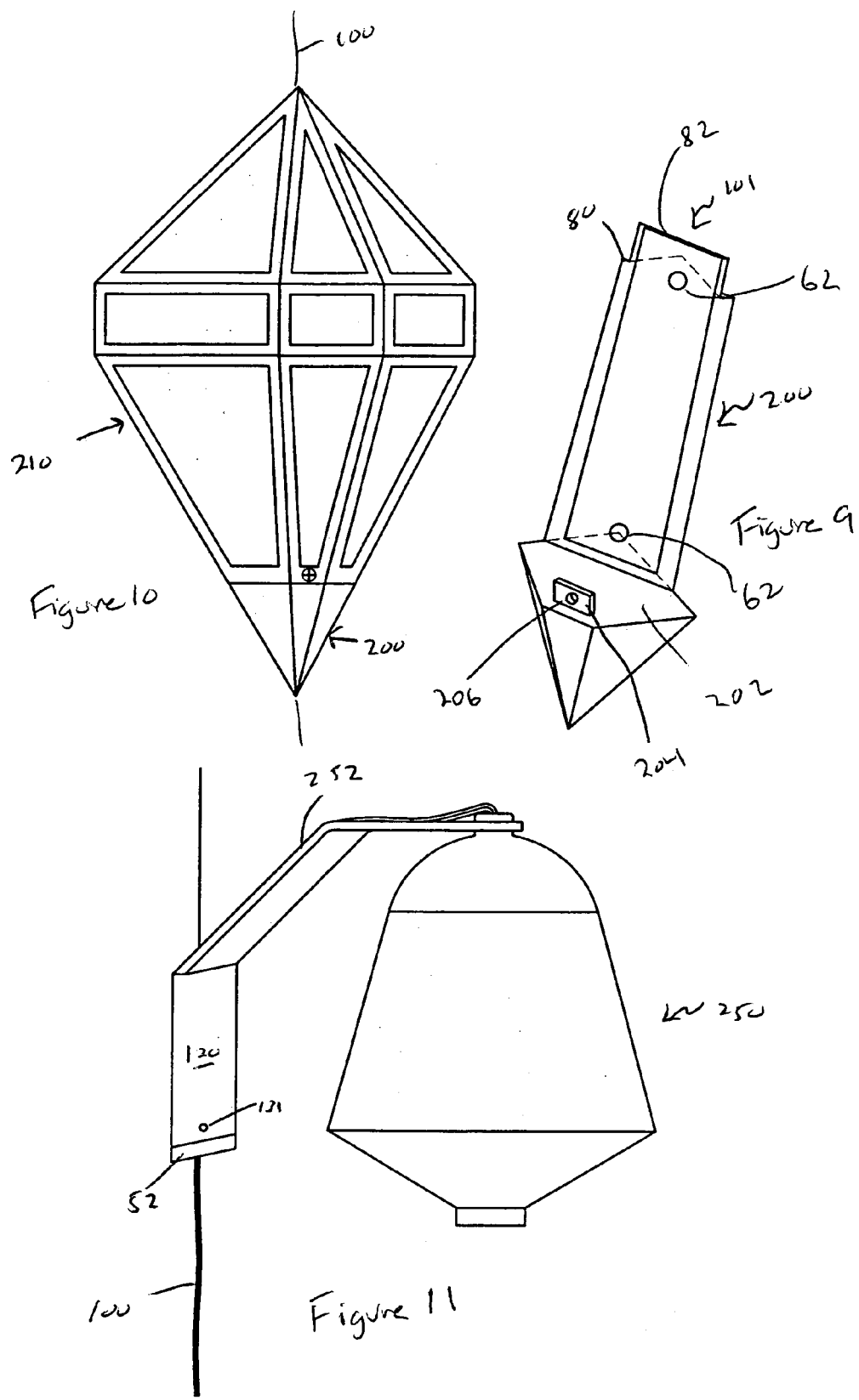

DEVICE FOR MOUNTING AN OBJECT AT THE CORNER OF A ROOM

BACKGROUND OF THE INVENTION

1. Field of the Invention

The present invention relates to a device for mounting an object at an interior corner of two intersecting walls.

2. Description of Related Art

Mounting devices are available in many configurations and enable the placement of various objects for wall display and/or storage. Many mounting devices include a plethora of parts and components, and are difficult to assemble and position during use. Other mounting devices may lack complexity but usually lack any versatility.

Exemplary mounting devices include U.S. Pat. No. 939,005 to Goedeke (Goedeke). Goedeke relates to a corner iron for bread and laundry baskets. The corner iron of Goedeke is stamped from a single piece of sheet metal and folded to form angular related sides and a reinforced bottom.

U.S. Pat. No. 4,727,815 to Miller relates to a corner shelf assembly, which is adapted to be mounted in a wall corner having two wall surfaces intersecting with respect to one another in the corner area at approximately a 90° angle. The Miller corner shelf assembly is directed toward a bracket used to support a shelving unit. The Miller shelf assembly allows the addition of a shelving member within the interior of the mounting plate. The mounting bracket of Miller enables a secure assembly over a wall shelf.

U.S. Pat. No. 6,015,123 to Perez et al. relates to a mounting bracket for mounting a camera base to a variety of different support structures such as a flat wall, inside corner or outside corner of a building. The Perez mounting bracket includes first and second outside corner panel sections for defining a concave right angle structure which is to be selectively fitted on an outside wall corner and a first and second planar panel sections that define a substantially planar structure to be selectively fitted to a planar wall section, and a first and second inside corner panel section for defining a convex right angle structure to be selectively fitted to an inside wall corner. In addition to the panel sections, Perez includes a first and second attachment panel section, which allow for the attachment of a camera base to the mounting bracket. Perez is specifically directed toward the mounting of a surveillance camera and includes a number of components amounting to a complex mounting bracket.

U.S. Pat. No. 6,364,261 to Vass, Jr. relates to a corner-mounting bracket that includes a V-shaped elongated base for mounting snuggly into an inner corner of a room and a rigid cantilevered member adjacently mounted to the base. The mounting bracket of Spass includes the attachment of the cantilevered member to the corner bracket. The cantilevered member supplies a means to mount objects for display. Vass includes a number of components that require a significant amount of adjustment and placement in order to function properly.

Accordingly, there exists a need for a mounting bracket for mounting a variety of objects at a corner of a room that requires a minimal amount of component. Also a need exists for mounting brackets that can provide substantial support of an object while remaining concealed from view during use. It would be further advantageous to have a mounting bracket, which can also be used to complement the overall appearance of the mounted object. It is to these and other shortcomings of the prior art that the present invention is directed.

SUMMARY OF THE INVENTION

The present invention provides a mounting assembly or device for mounting an object to an interior corner of a room. The mounting device enables the mounting of various objects such a2s, but not limited to, various useful articles and ornamental/decorative items. Certain useful articles include, but are not limited to lights, lamps, plant holders, platforms, small desks, shelves, ornamental items, etc.

In a first embodiment the mounting device includes a body member having a top end and a bottom end. At least one substantially V-shaped edge, and preferably a fan or accordion shaped edge having a central V-shape edge portion, can be provided at the top end. The V-shaped edge portion in conjunction with a tapered top back portion of the body member define a female receiving portion of the mounting device for receiving a male mounting portion provided on the object to be mounted. The shape of the back female receiving portion can be shaped to correspond to the shape of the male mounting portion, which may also include other edge shaped portions other than the V-shaped portion.

Once the mounting device is attached at the desired corner, the receiving portion is define by the walls adjacent the corner and the mounting device for receipt of the male mounting portion associated with the object to mount the object at the corner. The insertion of the male mounting portion secures the object in place at the corner and the object can be further supported from underneath by a ledge portion located at the bottom of the mounting device.

A second embodiment for the mounting assembly provides a first mounting member and a second mounting member. The first mounting member a bottom support ledge and a top-retaining flange. A feed or pass through aperture can also be provided for receiving or inserting an item, such as, but not limited to, an electrical cord, wiring, cable, speaker wire, rope, chain, etc. The first mounting member can also have an alignment or securement aperture, preferably threaded. In use, first mounting member is secured at the desired corner with the to the walls of a room substantially at corner 100, with the top retaining flange extending substantially upward. In conjunction with the adjacent walls, the flange defines a receiving area for receipt of a portion of the second mounting member, which is connected to the object intended to be mounted at the corner.

The second mounting member includes a body member and a overhang portion which together define a flange receiving area for receipt of top retaining flange of first mounting member when attaching the desired object at the corner. The second mounting member can also be provided with an alignment or securement aperture, with or without threads. When the second mounting member is properly secured to the first mounting member, the respective apertures are substantially aligned to permit a screw, bolt, rivet, etc. to be inserted and further secure the second mounting member to the first mounting member 50. The bottom ledge of the first mounting member can also provide support for the second mounting member and its associated object.

In either embodiment, the mounting assembly permits the desired object to be securely mounted in a room at a corner area, in a safe and attractive configuration.

It is therefore an object of the present invention to provide a mounting assembly for mounting an object at a corner area of a room.

It is another object of the present invention to provide a mounting assembly for mounting an object at a corner area of a room, with the mounting assembly having an ornamentally pleasant appearance.

It is another object of the present invention to provide a mounting assembly which permits mounting of an object at a corner area of a room in a relatively quick and easy manner.

In accordance with these and other objects, which will become apparent hereinafter, the instant invention will now be described with particular reference to the accompanying drawings.

BRIEF DESCRIPTION OF THE DRAWINGS

FIG. 9 is a perspective view illustrating an alternative embodiment for the first mounting member for the second embodiment of the present invention.

FIG. 10 is a perspective view illustrating an object, and hidden second mounting member, secured to the alternative first mounting member of FIG. 9.

FIG. 11 is a perspective view illustrating an object secured to a corner by use of the second embodiment for the present invention.

DETAILED DESCRIPTION OF THE PREFERRED EMBODIMENT

Figure 1:
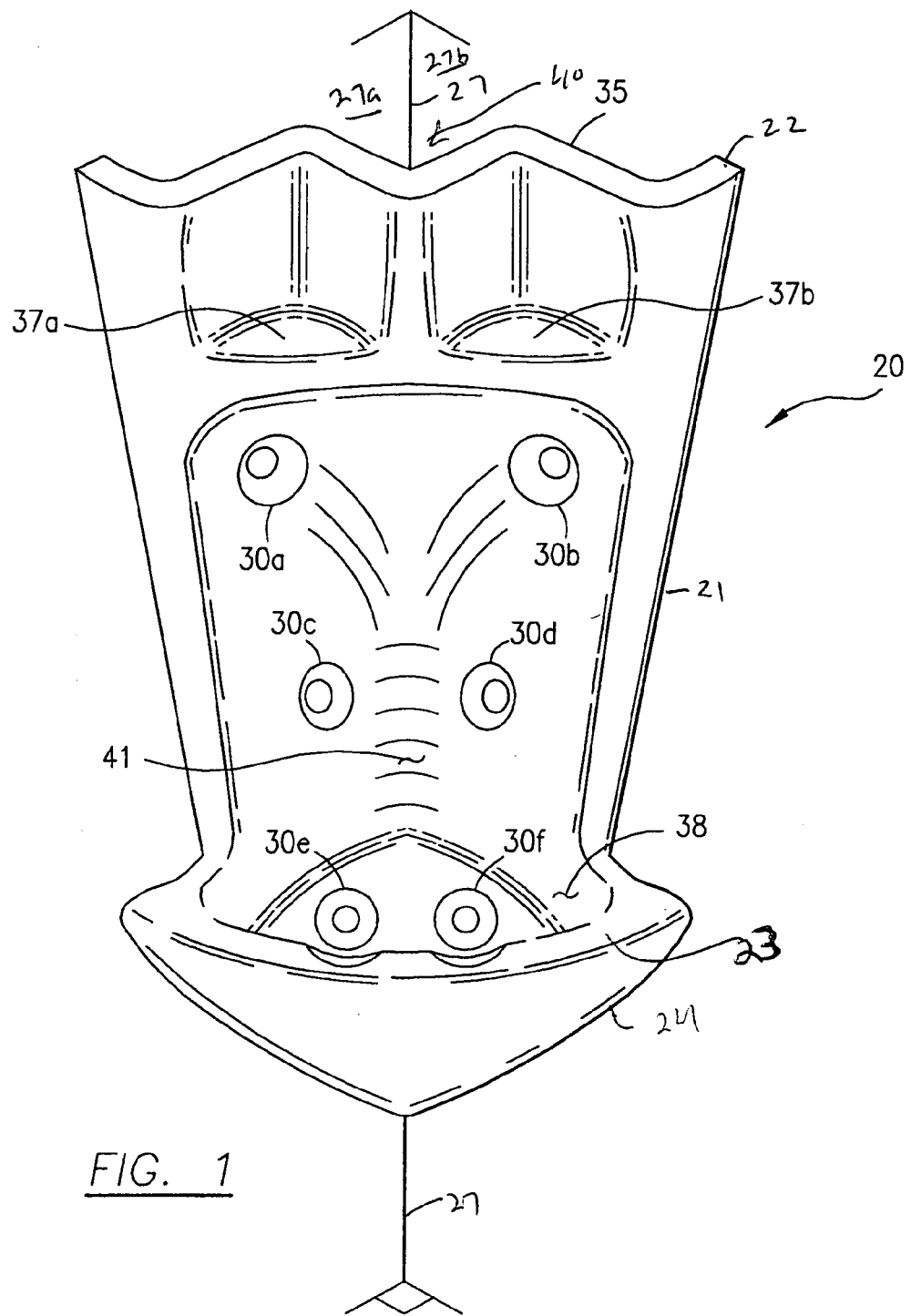
FIG. 1 shows a front view of a fan edge corner mount according to the present invention.
Figure 2:
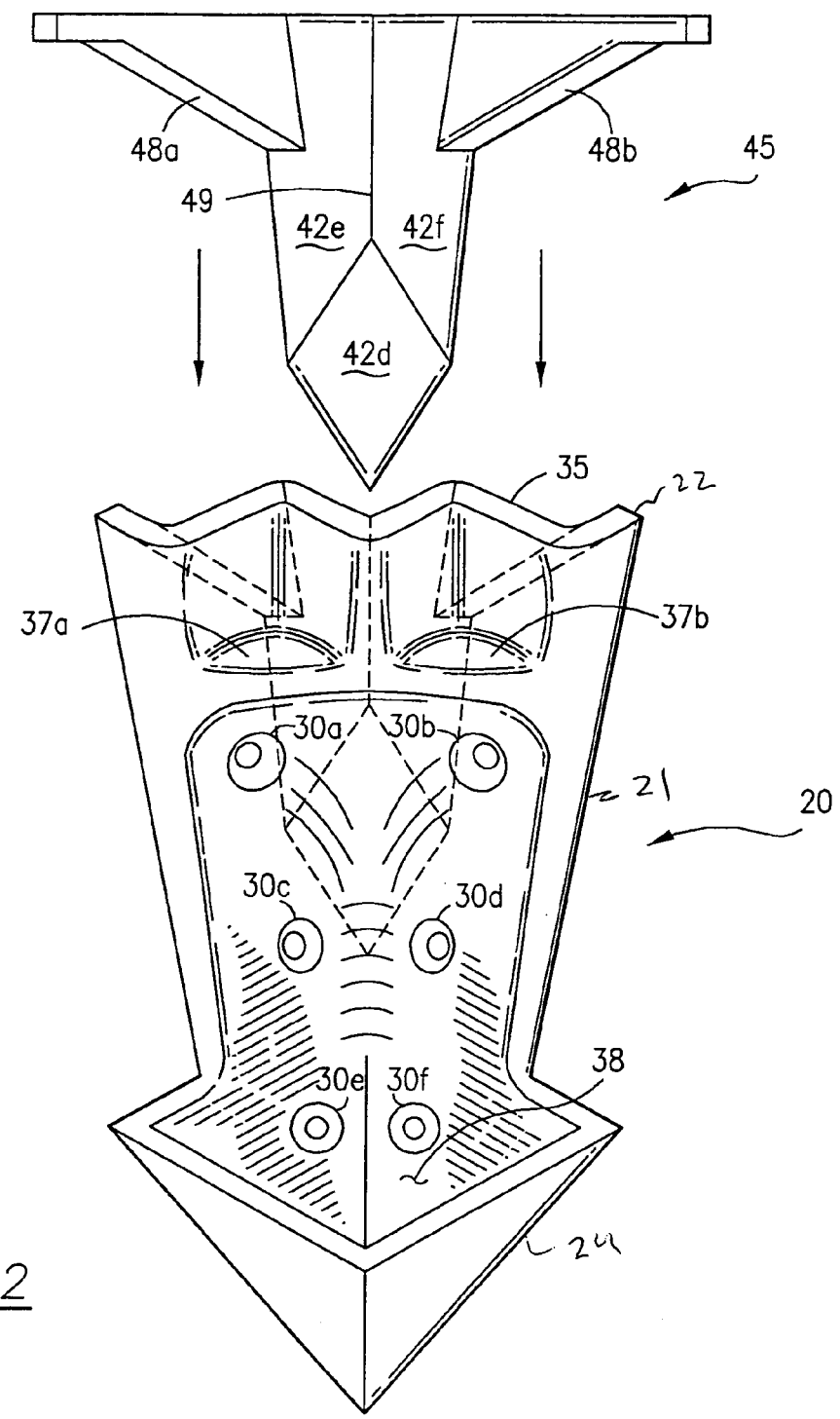
FIG. 2 shows a perspective view of the fan edge corner mount according to the present invention.
Figure 3:
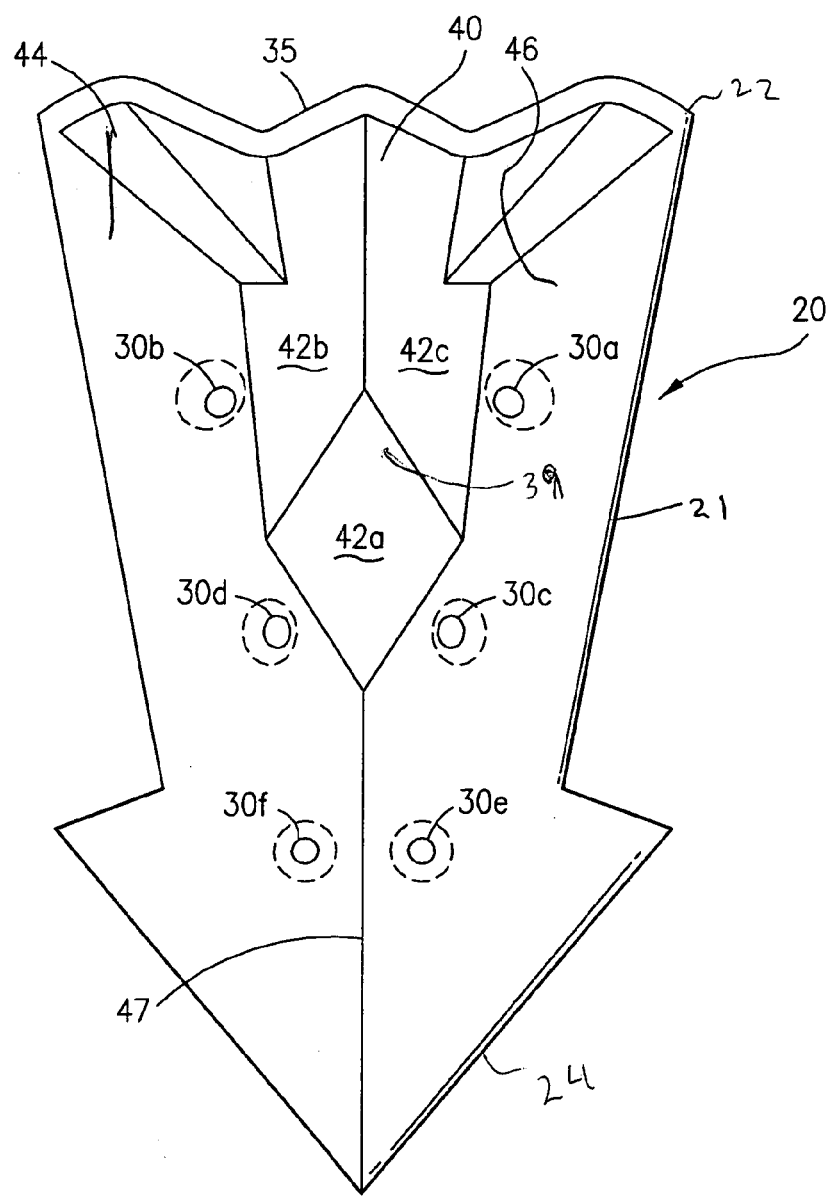
FIG. 3 shows an exemplary rear view of the fan edge corner mount according to the present invention.

Referring to FIGS. 1–3, a first embodiment of the present invention device for mounting an object at an interior corner of a room is illustrated and generally designated as mounting device 20. Mounting device 20 includes a body member 21 having a top end 22 and a bottom end 24. The shape, material and/or exterior appearance of body member 21 can correspond to the shape, material and/or exterior appearance of the object to be mounted by mounting device 20;

Top end 22 includes at least one substantially V-shaped edge, and preferably a fan or accordion shaped edge 35 having a central substantially V-shape edge portion. V-shaped edge portion 35 in conjunction with a tapered or cutout top back portion 39 of body member 21 define a female receiving portion 40 of mounting device 20 (in conjunction with the room walls) for receiving a male mounting or insertion portion 45 provided with an object 29 intended to be mounted at a corner 27 of room. The shape of the back female receiving portion 40 can be shaped to correspond to the shape of male mounting portion 45, and can include other edge shaped portions other than the V-shaped portion, as well as other cutout shapes for top back portion 39, for defining the shape of female receiving portion 40. Furthermore the shape of male mounting portion 45 is not limited to any particular shape. Male mounting portion 45 is preferably constructed integral with or monolithically formed with object 29. However, it is also within the scope of the present invention that male mounting portion 45 can be removably secured or connected to object 29. Object 29 is not limited to any particular design, construction or decorative element, and can be any item or object that a person desires to mount at corner 27.

Body member 21 can include one or more apertures, such as but not limited to apertures 30a–30f, for receiving mounting screws (not shown) or similar items (e.g. bolts, etc.) for attaching body member 21 at the designated interior corner. The received mounting screws are attached into the adjacent walls of the room, which define interior corner 27 for attaching body member 21 of mounting device 20 at corner 27. Though six apertures 30 are shown, the invention is not considered limited to any specific number of apertures. Though also not limiting, apertures 30 can be disposed at various angles with respect to each other to increase the strength of the attachment of body member 21 to the walls adjacent relevant corner 27.

In one configuration, the top set of apertures (30a and 30b) can be angled upwards, the middle set of apertures (30c and 30d) can be straight, and the bottom set of apertures (30e and 30f) can be angled downwards. Other configurations for the position of apertures 30 are also possible and considered within the scope of the invention. The mounting screws inserted within apertures 30 can be wood screws, though such is not considered limiting and other types of screws, bolts, pins, can be used and are all considered within the scope of the invention. The location of mounting apertures 30 on body member 21 can be chosen such that when object 29 is properly mounted at corner 27 by mounting device 20, mounting apertures 30 and their associated mounting screws are hidden from view.

Figure 13:
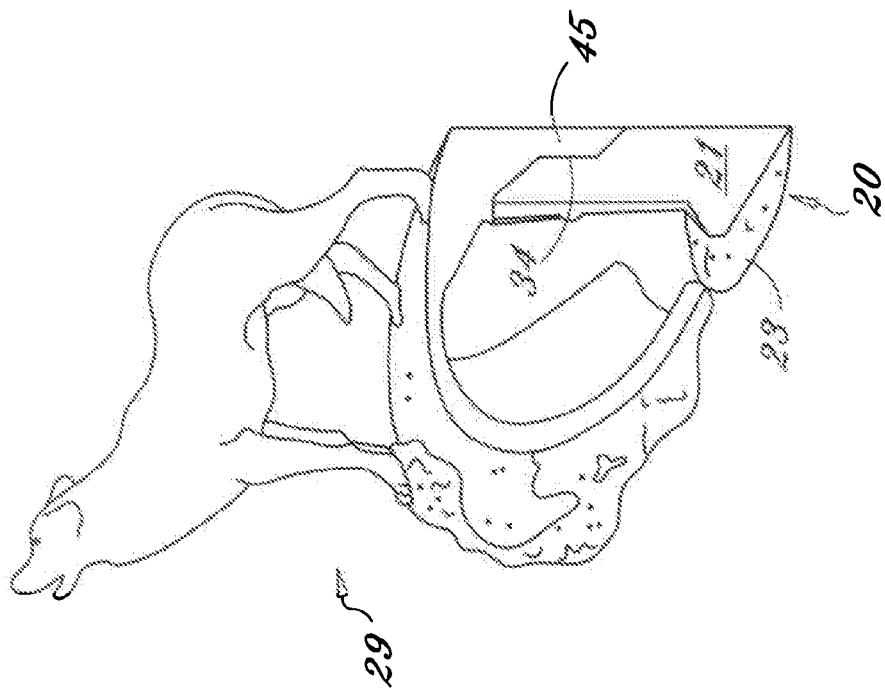
FIG. 13 is a perspective view showing the object secured by the mount for the first embodiment for the present invention.
Figure 12:
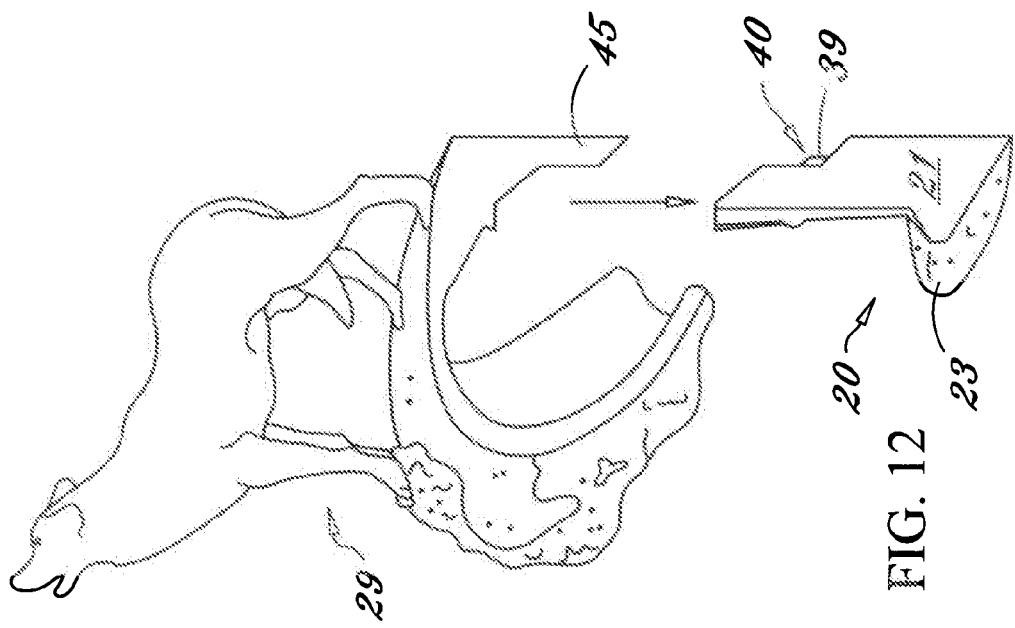
FIG. 12 is a perspective view illustrating how the object is attached to the mount for the first embodiment for the present invention.
Figure 14:
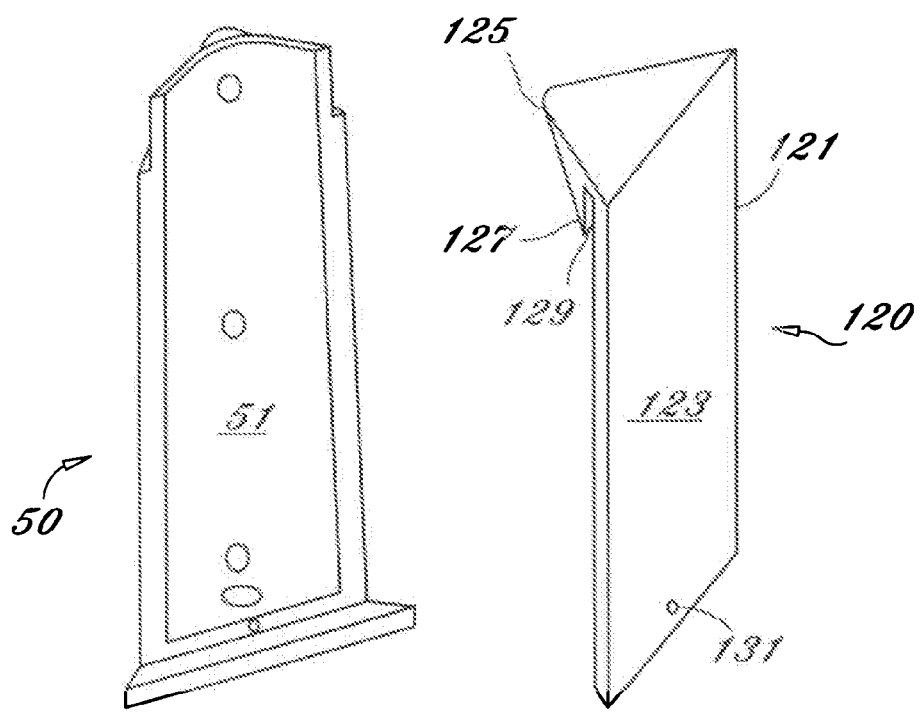
FIG. 14 is a perspective view of the second embodiment with the two main components shown separated.

Body member 21 can also include a conical chamber 38, which defines a resting ledge 23 for providing an additional area of support for mounted object 29 (See FIG. 13). If bottom apertures 30e and 30f are disposed within conical chamber 38, cutouts in ledge 23 can be provided to provide easier access for a tool (i.e. screwdriver, drill bit, etc.) to attach or drive the mounting screws into the wall. If no apertures are provided in the lower area, chamber 38 can be eliminated (i.e. filled in or solid) and support to object 29 can be provided over a larger surface area. Body member 21 can be provided with a concave center 41 to provide easier access to mounting apertures 30, though such is not considered limiting.

When mounting device 20 is attached at corner 27, body member 21 is shaped to fit snuggly at the corner of two intersecting walls 27a and 27b of the room with right rear portion 44 abutting a first wall of the two walls that define the corner and with left rear portion 46 abutting the second wall of the two walls. As best seen in FIG. 3, mounting apertures 30 can preferably extend through body member 21 at portions 44 or 46, such that it is not essential that the room corner be exactly ninety (90°) degrees when attaching mounting device 20 at corner 27. Once mounting device 20 is attached at corner 27 as described above (i.e. mounting screws, etc.), receiving portion 40 is define by walls 27a and 27b and top back portion 39 for receiving male mounting portion 45 of object 29 at corner 27. The insertion of male mounting portion or tooth 45 secures object 29 in place at corner 27 and the object can be further supported from underneath by ledge 23.

Body member 21, including chamber 38, is not limited to any particular configuration, material or shape. Thus, body member 21, including chamber 38 may be formed into many conceivable shapes that can coincide or correspond to the material, configuration and/or shape of object 29 and all are considered within the scope of the invention.

FIG. 3 illustrates a rear view of the mounting member 20, with mounting apertures 30a–30f shown on each side of a convex center 47 and a beveled mounting cavity 40. Three resting faces are shown within the cavity 40, a rear resting platform 42a and two rear resting faces 42b, 42c. However, it should be recognized that the present invention is not considered limited to any number of resting platforms and/or faces, nor is limited to particular shape for the resting platform and/or faces. Referring to FIG. 2, interlock tooth or male portion 45 can be provided with three engaging faces 42d–42f and corner engaging faces 48a and 48b. Interlock tooth 45 can be provided with a convex center 49, which allows engaging faces 42d–42f to engage into mounting cavity 40 and then rest upon the resting faces 42a–42c. Additionally, convex center 49 of interlock tooth 45 can slide and fit into the center of resting faces 42b, 42c. Again, it should be recognized that the present invention is not limited to any particular shape for male interlock tooth 45 and that various shapes can be chosen and are considered within the scope of the invention. Though not required, the shape of tooth 45 can be selected to match or correspond to the shape of cutout portion 39.

Figure 8:
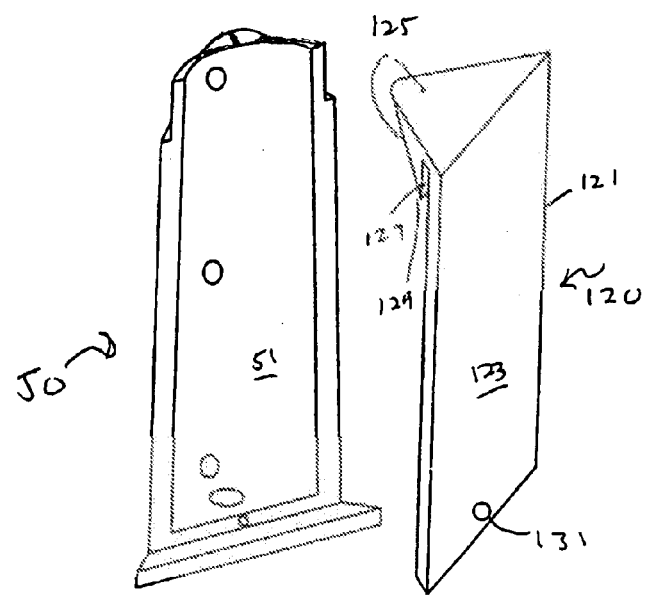
FIG. 8 is a perspective view of the first and second mounting members for the second embodiment of the present invention.
Figure 8A:
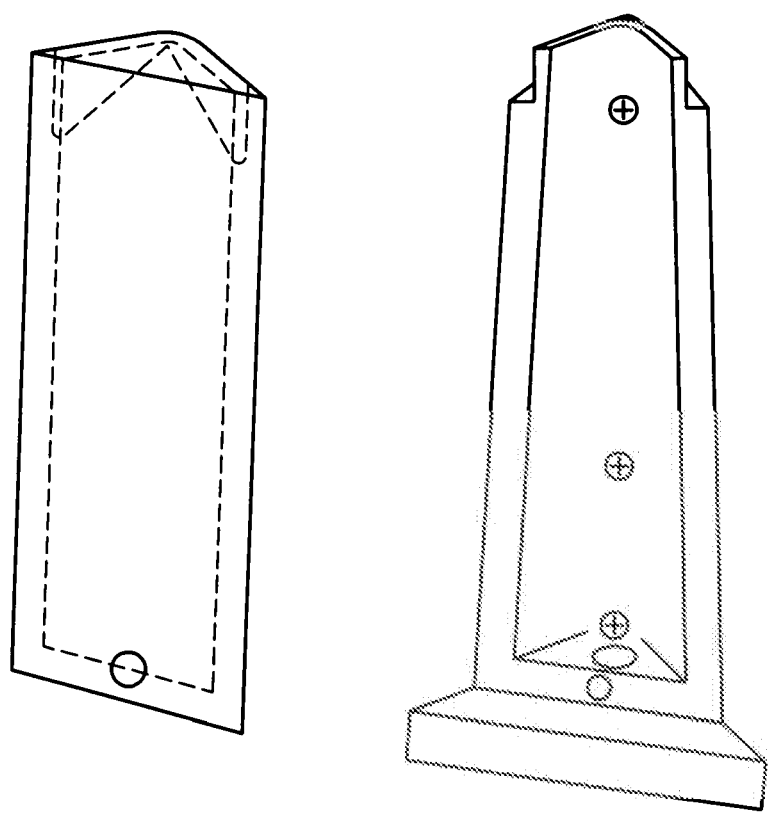
FIGS. 8a and 8b are several views illustrating the mating relationship between the flange and receiving slot.
Figure 8B:
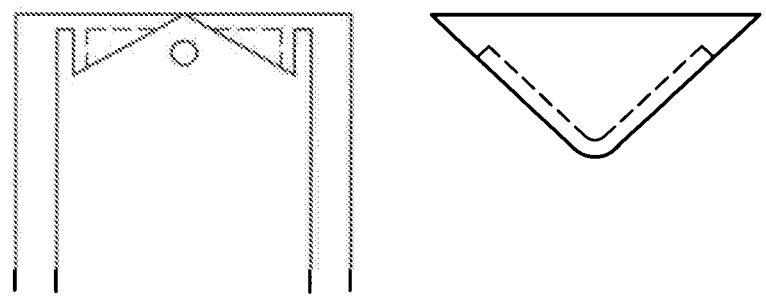

As seen in FIG. 8 a second embodiment for the mounting assembly of the present invention is illustrated and can include a first mounting member generally designated as reference numeral 50 and a second mounting member generally designated as reference numeral 120.

Figure 4:
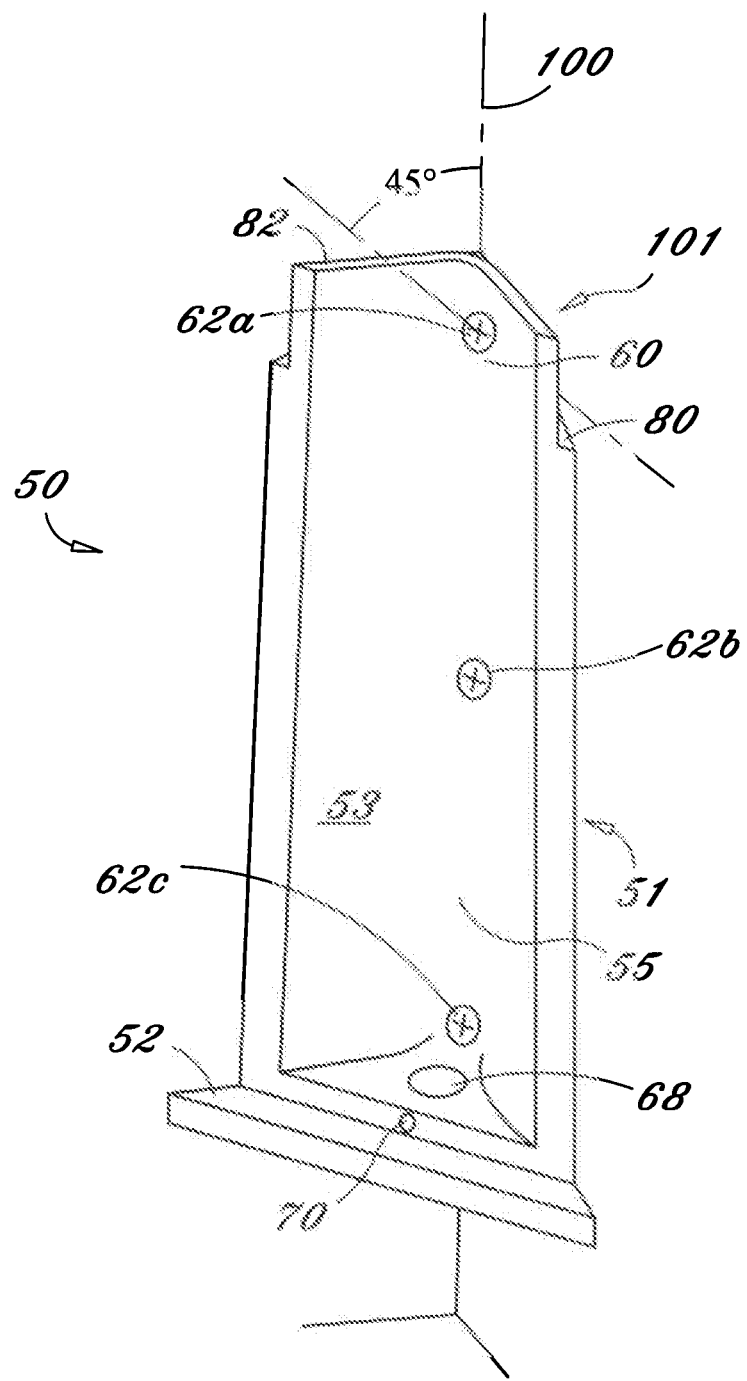
FIG. 4 shows an exemplary perspective view of a lip edge corner mount according to the present invention.

As seen in FIG. 4, first mounting member 50 includes a body member 51. A ledge or platform 52 can be provided at the bottom of body member 51. A top-retaining flange 82 can be provided at the top of body member 51 and along with body member 51 defines a lip area 80. Body member 51 can be provided with one or more apertures 62, which in conjunction with corresponding mounting screw(s) or similar fasteners, retain or secure body member 51 to the wall of a room. The location of mounting apertures 62 on body member 51 can be selected such that mounting apertures 62 and their corresponding or associated mounting screws are not seen when the object is properly mounted at corner 100.

As seen in FIG. 4, body member 51 can be provide with three mounting apertures 62a–62c, though such number is not considered limiting and any number of apertures can be provided and are considered within the scope of the invention. The shape of body member is not limited to any particular shape. However, it is preferred, though not required, that the shape of body member 51 can be conducive for mounting into the corner of two intersecting walls of a room.

As shown in FIG. 4, an inner portion 53 can be somewhat circular in shape and defines a space or cavity 55. Thus, similar to the embodiment shown in FIGS. 1 through 3, body member 51 can be provided with a concave center 53. However, the particular shape of center 53 is not limited to any particular shape.

Body member 51 can also be provided with an aperture 68, which can be used for receiving or inserting an item, such as, but not limited to, an electrical cord, wiring, cable, speaker wire, rope, chain, etc. into space or cavity 55, which may extend from or to the item to be mounted by first mounting member 50 depending on its nature (e.g. lamp, reading light, shelf supporting an electronic device having a cord, etc.). For similar purposes a similar aperture can also be provided on body member 21 of the first embodiment of the present invention. Body member 51 can also contain an alignment aperture 70 can also be provided, whose purpose will be discussed further below. One or more of apertures 62 and/or 70 can be threaded, though such is not considered limiting.

Figure 5:
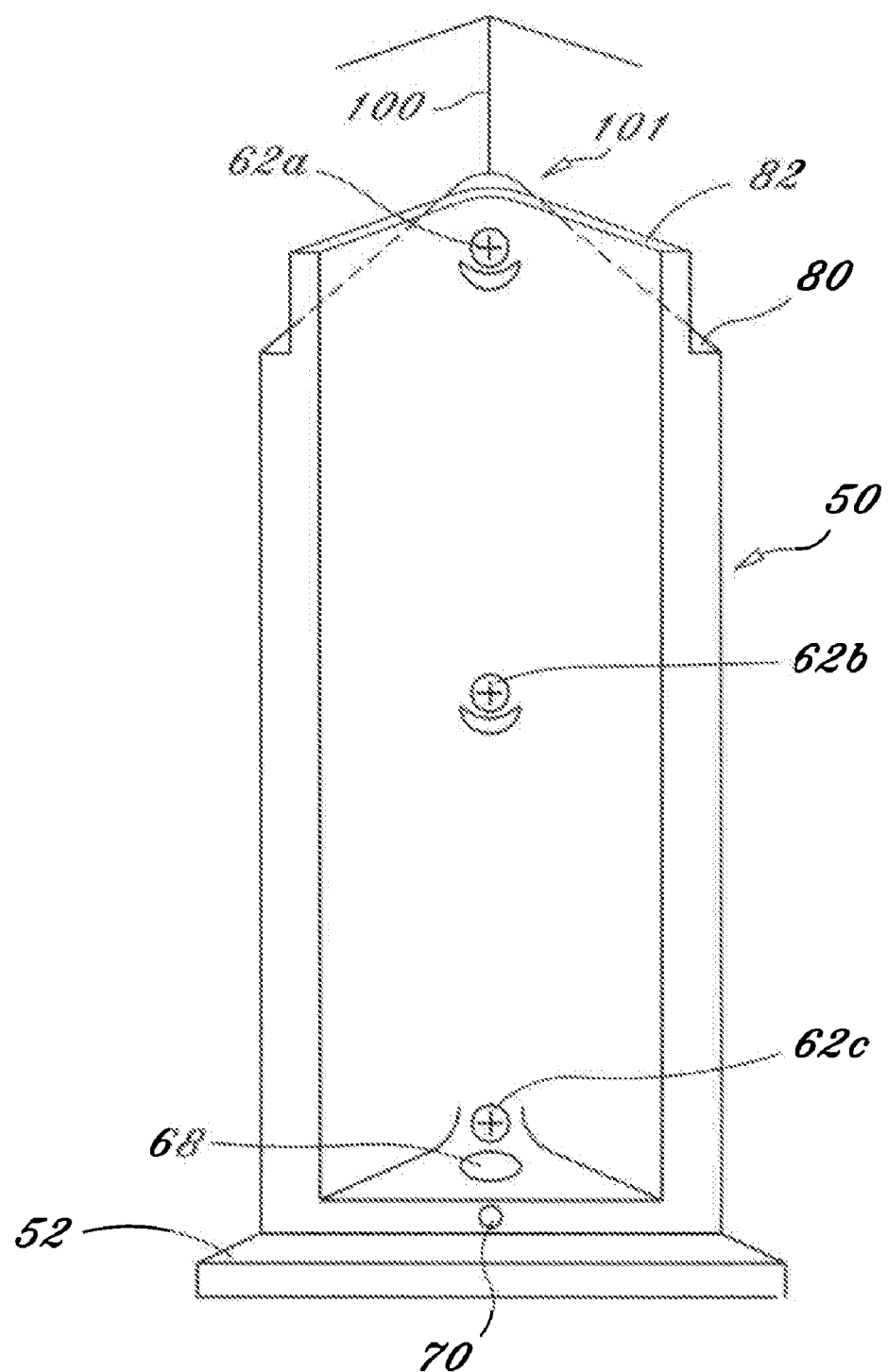
FIG. 5 shows an exemplary front view of the lip edge corner mount according to the present invention.

As seem in FIG. 5, body member 51 is secured to the walls of a room substantially at corner 100. Flange 82 extends upward from lip area 80 and in conjunction with adjacent walls of the room surround corner 100 define a receiving area 101 for receipt of a portion of a second mounting member 120 associated with or attached to the object to be mounted at corner 100 (i.e. light 210—FIG. 10, light 250—FIG. 11, shelf, etc.). Second mounting member 120 can be permanently or removably attached to the object. Where a removable connection is provided, the same second mounting member 120 can be interchangeably used for mounting a variety of objects at corner 100.

Second mounting member 120 is provided with a body member 121, which can vary in shape. Body member 121 includes a front portion 123 and a top overhang portion 125, which together define a receiving slot or area 127 for receipt of top retaining flange 82 of body member 51 when attaching the desired object to corner 100. The length, width and/or height of slot 127 can substantially correspond to the length, width and/or height of flange 82, such that an edge 129 of portion 125 rest on and is supported by lip area 80 when the object is mounted to corner 100. However, it is also within the scope of the invention that the length, width and/or height of slot 127 and flange 82 do not correspond, and that second mounting member 120 is safely secured to first mounting member 50 by the inserting of flange 82 into receiving slot 127. Thus, receiving area 101 in conjunction with the top retaining flange 82 allow for the secured placement behind top retaining flange 82 for overhang portion 125 of second mounting member 120.

An aperture 131, with or without threads, can be provided at a lower area of front portion 123 of body member 121. When second mounting member 120 is properly secured or attached to first mounting member 50, aperture 131 is substantially aligned with aperture 70 of body member 51 to permit a screw, bolt, rivet, etc. to be inserted through and within both apertures to further secure second mounting member 120 to first mounting member 50. Alignment apertures 70 and 131, provides a means to ensure proper positioning, as well as additional securement, between first mounting member 50 and second mounting member 120. Bottom surface or platform 52 can also provide support for second mounting member 120 and its associated object.

Figure 6:
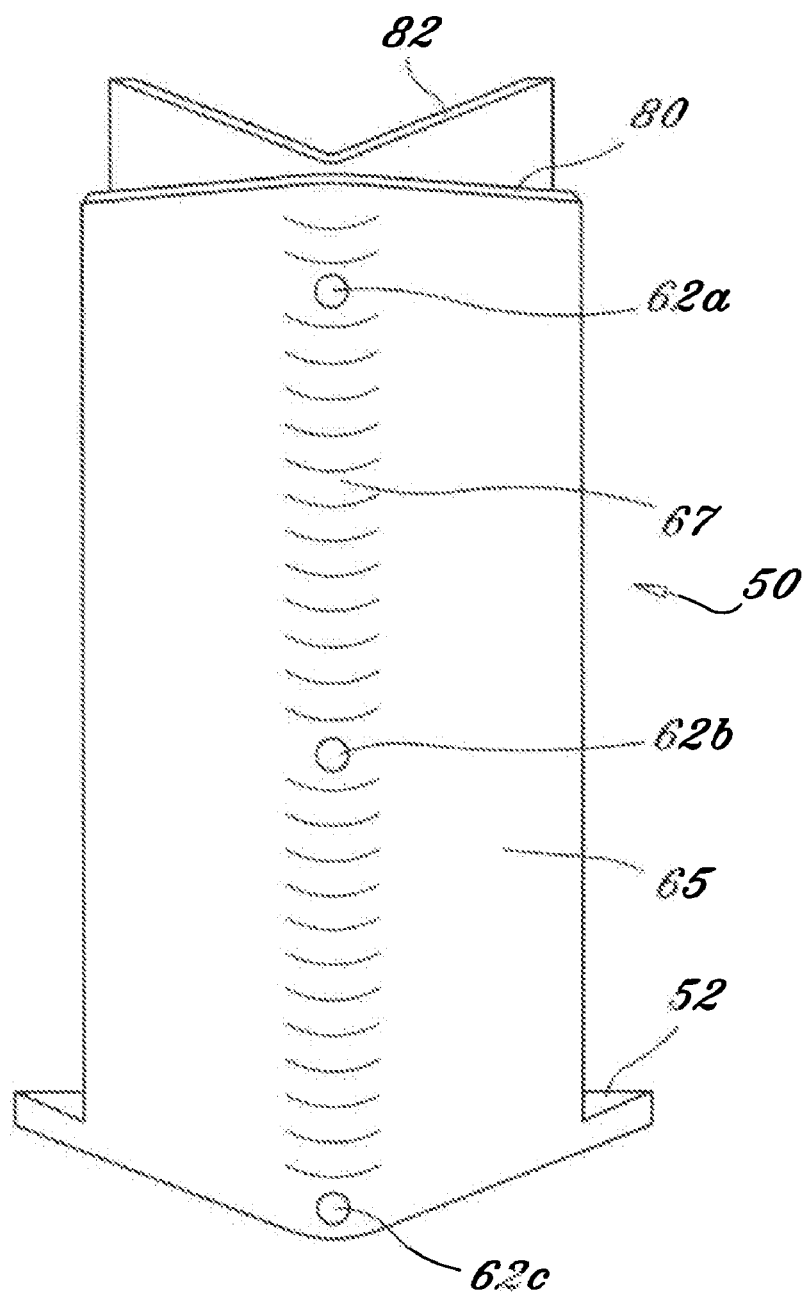
FIG. 6 shows an exemplary rear view of the lip edge corner mount according to the present invention.

Referring now to FIG. 6, a rear view of the mounting member 50 is shown and illustrates a rear portion 65 of body member 51 that includes the plurality of apertures 62a–62c, which can be provide along a convex center 67, though other shapes are within the scope of the invention. Similar to the mounting apertures of the first embodiment discussed above, mounting apertures 62 can be disposed at different angles from each other. Top retaining edge 82 extends above the rear lip area 80. When first mounting member 50 is properly secured at corner 100 (e.g. conventional wood screws, screws, bolts, etc. inserted through and within apertures 62 and driven into corner 100 or one or both of the two intersecting walls that define corner 100) rear portion 65 can abut corner 100 and receiving area 101 is defined for receipt of overhang portion 125 of second mounting member 120.

Figure 7A:
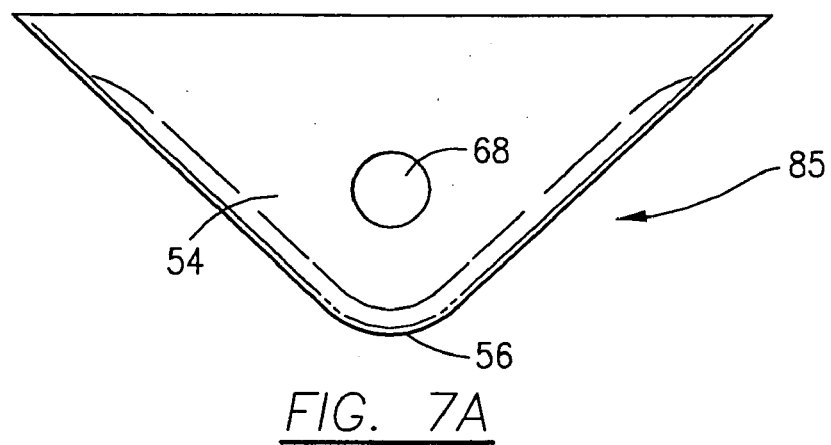
FIG. 7A shows an exemplary bottom view of the lip edge corner mount according to the present invention.
Figure 7B:
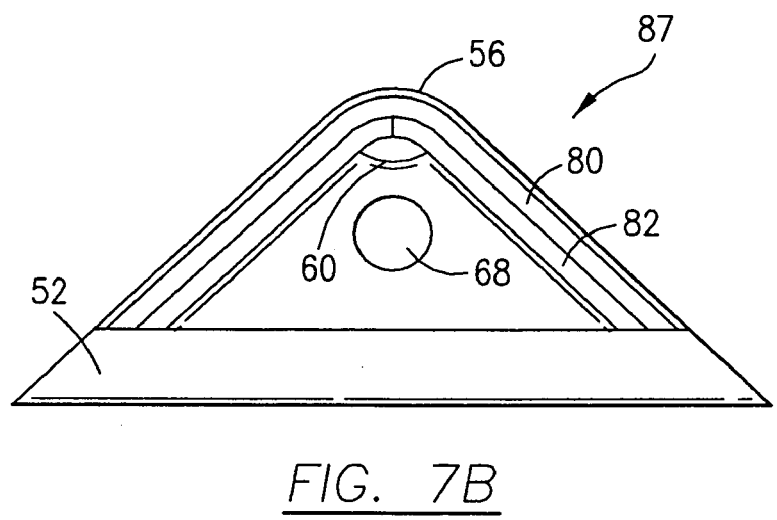
FIG. 7B shows an exemplary top view of the lip edge corner mount according to the present invention.

FIG. 7 shows a bottom (FIG. 7a) and a top view (FIG. 7b) of first mounting member 50. The bottom view (FIG. 7a) illustrates one configuration for the bottom area 85 of body member 51 and can include a bottom surface 54, which can be substantially flat, though such is not considered limiting. Aperture 68 is also shown and can extend through bottom surface 54. As also seen portion 56 of body member 51 which abuts corner 100, can be provided in a curved or rounded configuration, though again, such shape is not considered to be limiting. By providing portion 56 of body member in a curved configuration, some adjustment of body member 51 is permitted to provide a firm fit of first mounting member 50 at corner 100.

The top view (FIG. 7b) shows a top area 87 of body member 51, including the components (at least flange 82 and possibly lip area 80) which provide the primary securement mechanism for connecting first mounting member 50 to second mounting member 120, which results in the desired object being securely mounted in a room at corner 100. Overhang portion 125 of second mounting member 120 is received within area 101 by the insertion of flange 82 within slot 127 of body member 121. When first mounting member 50 is attached at corner 100, receiving area 101 is between flange 82 and the two intersecting walls that define corner 100. The relationship between flange 82 and slot 127 securely retain first mounting member 50 to second mounting member 120, which results in the object associated with or connected to second mounting member 120 to be secured or mounted at corner 100. Overhang portion 125 can be snuggly disposed within area 101. A snug insertion of flange 82 within slot 127 can also be provided. As mentioned above, depending on the dimensions of flange 82 and slot 127, a lower member 129 of overhang portion 125 can rest on lip area 80 to provide further support. 80. As mentioned above, bottom surface or platform 52 may also provide further support for second mounting member 120.

FIG. 9 shows an alternative configuration for first mounting member, generally designated as reference numeral 200, which may be used based on the shape or design of the object to be mounted at corner 100. The same reference numerals will be used to describe the same elements that appear in both first mounting member 50 and first mounting member 200. Top portion 87 (flange 82, lip area 80, receiving area 101) remains the same. The main change between first mounting member 50 and first mounting member 200 is found at the lower portion. A larger bottom surface 202 is provided as compared to bottom surface 52. Furthermore, the bottom shape is different, and can be chosen to correspond to the shape of the object. Thus, in this alternative embodiment, the bottom portion of first mounting member 200 can serve as part of the overall decorative design for the object mounted at corner 100, which also helps to hide the mounting device (See FIG. 10). Another difference is that alignment aperture 70 is eliminated in favor for alignment flange 204. Alignment flange 204 protrudes upward from bottom surface 202 and includes an aligning aperture 206, which can be threaded or unthreaded. Aligning aperture 206 functions similar to alignment aperture 70 and is aligned with aperture 131 of second mounting member 120. Given the distance that flange 204 extends in front of top retaining flange 82, the shape of second mounting member 120 may have to be altered to permit both proper alignment between apertures 131 and 206 and the insertion of flange 82 within slot 127. Thus, the shape of body member 121 of second mounting member 120 is not limited to any particular one shape and various shapes and dimensions are considered within the scope of the invention. Additionally, an aperture, similar to aperture 68, can be provided for inserting cords, wiring, etc.

FIG. 11 shows a light 250 secured to an arm 252 which in turn is secured or attached to second mounting member 120. Arm 252 can be constructed integral with or monolithically formed with second mounting member 120. Alternatively, arm 252 can be removably connected to second mounting member 120. Second mounting member 120 is secured to first mounting member 50 and mounting member 50 is secured at corner 100 as discussed above. In this example, the mounting assembly (mounting members 50 and 120) are visible, when light 250 is mounted in the room at corner 100.

It should be recognized that for all embodiments of the present invention the particular objects or items to be mounted at corner 100 is endless and not limited to any one particular object or item. Further, the shapes and materials for the mounting assemblies of all embodiments of the present invention are also not limited. However, it is preferred that the mounting members and assemblies be constructed from a relatively strong material, especially where the item or object to be mounted may be relatively heavy or may be supporting a further relatively heavy object. Though the invention is not limited to any one object, certain objects which can be mounted by the present invention include, without limitation, lights, lamps, stands, positioning arms, plant holders, shelves, small desks, ornamental pieces, etc.

Depending on the object to be mounted, in either embodiment the mounting assembly may be hidden from sight or all or part of the mounting assembly may become part of or blend in with the design of the object. The present invention is not limited to any particular number, location or angle position for the mounting apertures in any of the embodiments of the present invention. Furthermore, the length, widths and other dimensions of the mountings assemblies or devices is not limited to any particular size. Furthermore, none of the embodiments for the present invention are limited to any one particular material for their construction. For example, though not limiting, mounting device 20 can be constructed from bronze, other metals, plastic, wood, etc. Similarly, mounting members 50, 120 and 200 can be constructed from plastic, bronze, other metals, wood, etc.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A mounting assembly for mounting an object to an interior corner portion defined by two intersecting walls of a room, said mounting assembly comprising:

a first mounting member adapted to be directly attached to an interior corner portion defined by two intersecting walls of a room, said first mounting member having a first body portion, a bottom ledge portion and a top retaining flange extending upward from a top edge of said first body portion to define a lip area, said first body portion having a rear surface and at least one corner mounting aperture;

a second mounting member removably connected to said first mounting member, said second mounting member having a second body portion and a overhang portion which together define a flange receiving slot, at least a portion of said retaining flange inserted within said flange receiving slot when said second mounting member is connected to said to first mounting member, said second mounting member attached to an object;

wherein when mounting the object to an interior corner area of a room, at least a portion of said rear surface of said first mounting member is adjacent and directly attached to a corner portion of a room defined by a first wall and a second wall to define a receiving area between the first wall, the second wall and said top retaining flange for receipt of at least a portion of said overhang portion when at least a portion of said top retaining flange is inserted within the flange receiving slot of said second mounting member for mounting the object to the corner portion of room defined by the first wall and the second wall;

wherein said rear surface of the first mounting member is substantially rounded in shape and directly abuts the corner portion.

2. The mounting assembly of claim 1 wherein the attachment of the first mounting member to the corner portion of the room allows a wall or walls of the room to assist in supporting the weight of the object attached to the second mounting member.

3. A mounting assembly for mounting an object to an interior corner portion defined by two intersecting walls of a room, said mounting assembly comprising:

a first mounting member adapted to be directly attached to an interior corner portion defined by two intersecting walls of a room, said first mounting member having a first body portion, a bottom ledge portion and a top retaining flange extending upward from a top edge of said first body portion to define a lip area, said first body portion having a rear surface and at least one corner mounting aperture;

a second mounting member removably connected to said first mounting member, said second mounting member having a second body portion and a overhang portion which together define a flange receiving slot, at least a portion of said retaining flange inserted within said flange receiving slot when said second mounting member is connected to said to first mounting member, said second mounting member attached to an object;

wherein when mounting the object to an interior corner area of a room, at least a portion of said rear surface of said first mounting member is adjacent and directly attached to a corner portion of a room defined by a first wall and a second wall to define a receiving area between the first wall, the second wall and said top retaining flange for receipt of at least a portion of said overhang portion when at least a portion of said top retaining flange is inserted within the flange receiving slot of said second mounting member for mounting the object to the corner portion of room defined by the first wall and the second wall;

wherein said first body portion having a first securing aperture and said second body portion having a second securing aperture, wherein when said first securing aperture is aligned with said second securing aperture when said top retaining flange is properly positioned within said flange retaining slot of said second mounting member.

4. The mounting assembly of claim 1 wherein a lower portion of said second body portion rests upon said bottom ledge portion of said first mounting member when said top retaining flange is properly positioned within said flange retaining slot of said second mounting member.

5. A mounting assembly for mounting an object to an interior corner portion defined by two intersecting walls of a room, said mounting assembly comprising:

a first mounting member adapted to be directly attached to an interior corner portion defined by two intersecting walls of a room, said first mounting member having a first body portion, a bottom ledge portion and a top retaining flange extending upward from a top edge of said first body portion to define a lip area, said first body portion having a rear surface and at least one corner mounting aperture;

a second mounting member removably connected to said first mounting member, said second mounting member having a second body portion and a overhang portion which together define a flange receiving slot, at least a portion of said retaining flange inserted within said flange receiving slot when said second mounting member is connected to said to first mounting member, said second mounting member attached to an object;

wherein when mounting the object to an interior corner area of a room, at least a portion of said rear surface of said first mounting member is adjacent and directly attached to a corner portion of a room defined by a first wall and a second wall to define a receiving area between the first wall, the second wall and said top retaining flange for receipt of at least a portion of said overhang portion when at least a portion of said top retaining flange is inserted within the flange receiving slot of said second mounting member for mounting the object to the corner portion of room defined by the first wall and the second wall;

wherein said first body portion having a pass through aperture for feeding an item therethrough;

wherein a front surface of said first body portion is substantially rounded in shape and said at least one corner mounting aperture is a plurality of corner mounting apertures extending through said first body portion from said front surface to said rear surface.

6. The mounting assembly of claim 1 wherein said second body portion and said overhang portion are monolithically formed with each other to define said flange receiving slot.

7. The mounting assembly of claim 1 wherein said first body portion, said bottom ledge portion and said top retaining flange are monolithically formed with each other.

8. A mounting assembly for mounting an object to an interior corner portion defined by two intersecting walls of a room, said mounting assembly comprising:

a first mounting member adapted to be directly attached to an interior corner portion defined by two intersecting walls of a room, said first mounting member having a first body portion, a bottom ledge portion and a top retaining flange extending upward from a top edge of said first body portion to define a lip area, said first body portion having a substantially rounded rear surface, a substantially rounded front surface and a plurality of corner mounting apertures, each of said plurality of corner mounting apertures extending through said first body portion from said rear surface to said front surface;

a second mounting member removably connected to said first mounting member, said second mounting member having a second body portion and a overhang portion which together define a flange receiving slot, at least a portion of said retaining flange inserted within said flange receiving slot when said second mounting member is connected to said to first mounting member, said second mounting member attached to an object;

wherein when mounting the object to an interior corner portion of a room, at least a portion of said rear surface of said first mounting member is adjacent and directly attached to a corner portion of a room defined by a first wall and a second wall to define a receiving area between the first wall, the second wall and said top retaining flange for receipt of at least a portion of said overhang portion when said top retaining flange is inserted within the flange receiving slot of said second mounting member for mounting the object to the corner portion of room defined by the first wall and the second wall;

wherein a lower portion of said second body portion rests upon said bottom ledge portion of said first mounting member when said top retaining flange is properly positioned within said flange retaining area of said second mounting member;

wherein said first body portion having a first securing aperture and said second body portion having a second securing aperture, wherein when said first securing aperture is aligned with said second securing aperture when said top retaining flange is properly positioned within said flange retaining slot of said second mounting member.

9. The mounting assembly of claim 8 wherein said first body portion having a pass through aperture for feeding an electrical cords or wires therethrough.

10. The mounting assembly of claim 8 wherein said plurality of corner mounting apertures, said first securing aperture and said second securing aperture are all threaded.

11. The mounting assembly of claim 8 wherein the attachment of the first mounting member to the corner portion of the room allows a wall or walls of the room to assist in supporting the weight of the object attached to the second mounting member.

12. A mounting assembly for mounting an object to an interior corner portion defined by two intersecting walls of a room, said mounting assembly comprising:

a first mounting member adapted to be directly attached to an interior corner portion defined by two intersecting walls of a room, said first mounting member having a first body portion, a bottom ledge portion and a top retaining flange extending upward from a top edge of said first body portion to define a lip area, said first body portion having a rear surface and at least one corner mounting aperture;

a second mounting member removably connected to said first mounting member, said second mounting member having a second body portion and a overhang portion which together define a flange receiving slot, at least a portion of said retaining flange inserted within said flange receiving slot when said second mounting member is connected to said to first mounting member, said second mounting member attached to an object;

wherein when mounting the object to an interior corner area of a room, at least a portion of said rear surface of said first mounting member is adjacent and directly attached to a corner portion of a room defined by a first wall and a second wall to define a receiving area between the first wall, the second wall and said top retaining flange for receipt of at least a portion of said overhang portion when at least a portion of said top retaining flange is inserted within the flange receiving slot of said second mounting member for mounting the object to the corner portion of room defined by the first wall and the second wall;

wherein said first body portion having a first securing aperture and said second body portion having a second securing aperture, wherein when said first securing aperture is aligned with said second securing aperture when said top retaining flange is properly positioned within said flange retaining slot of said second mounting member.

13. A mounting assembly for mounting an object to an interior corner portion defined by two intersecting walls of a room, said mounting assembly comprising:

a first mounting member directly attached to an interior corner portion defined by two intersecting walls of a room, said first mounting member having a first body portion, a bottom ledge portion and a top retaining flange extending upward from a top edge of said first body portion to define a lip area, said first body portion having a rear surface and at least one corner mounting aperture;

a second mounting member removably connected to said first mounting member, said second mounting member having a second body portion and a overhang portion which together define a flange receiving slot, at least a portion of said retaining flange inserted within said flange receiving slot when said second mounting member is connected to said to first mounting member, said second mounting member attached to an object;

wherein when mounting the object to an interior corner area of a room, at least a portion of said rear surface of said first mounting member is adjacent and directly attached to a corner portion of a room defined by a first wall and a second wall to define a receiving area between the first wall, the second wall and said top retaining flange for receipt of at least a portion of said overhang portion when at least a portion of said top retaining flange is inserted within the flange receiving slot of said second mounting member for mounting the object to the corner portion of room defined by the first wall and the second wall;

wherein said first body portion having a pass through aperture for feeding an item therethrough;

wherein a front surface of said first body portion is substantially rounded in shape and said at least one corner mounting aperture is a plurality of corner mounting apertures extending through said first body portion from said front surface to said rear surface.

14. The mounting assembly of claim 13 wherein a lower portion of said second body portion rests upon said bottom ledge portion of said first mounting member when said top retaining flange is properly positioned within said flange retaining slot of said second mounting member.

15. The mounting assembly of claim 13 wherein the attachment of the first mounting member to the corner portion of the room allows a wall or walls of the room to assist in supporting the weight of the object attached to the second mounting member.

* * * * *